United States Patent
Ehrlich et al.

(10) Patent No.: US 12,339,401 B2
(45) Date of Patent: Jun. 24, 2025

(54) MULTIPATH AND NOISE REDUCTION FOR TIME-OF-FLIGHT CAMERAS

(71) Applicant: BASLER AG, Ahrensburg (DE)

(72) Inventors: Timon Ehrlich, Ahrensburg (DE); Dominik Wolters, Ahrensburg (DE)

(73) Assignee: BASLER AG, Ahrensburg (DE)

( * ) Notice: Subject to any disclaimer, the term of this patent is extended or adjusted under 35 U.S.C. 154(b) by 789 days.

(21) Appl. No.: 17/637,469

(22) PCT Filed: Aug. 11, 2020

(86) PCT No.: PCT/EP2020/072532
§ 371 (c)(1),
(2) Date: Feb. 23, 2022

(87) PCT Pub. No.: WO2021/037560
PCT Pub. Date: Mar. 4, 2021

(65) Prior Publication Data
US 2022/0326360 A1 Oct. 13, 2022

(30) Foreign Application Priority Data
Aug. 27, 2019 (DE) .......................... 102019122891.3

(51) Int. Cl.
*G01S 7/4865* (2020.01)
*G01S 17/26* (2020.01)
*G01S 17/89* (2020.01)

(52) U.S. Cl.
CPC ............ *G01S 7/4865* (2013.01); *G01S 17/26* (2020.01); *G01S 17/89* (2013.01)

(58) Field of Classification Search
CPC ........ G01S 7/4865; G01S 17/26; G01S 17/89; G01S 7/4915; G01S 17/36; G01S 17/894
See application file for complete search history.

(56) References Cited

U.S. PATENT DOCUMENTS 10,928,489 B2 * 2/2021 Xu .......................... G01S 17/10
11,525,918 B2 * 12/2022 Ulrich ................... G01S 17/894
(Continued)

FOREIGN PATENT DOCUMENTS

DE 102007046562 4/2009
DE 102010003409 9/2011
(Continued)

OTHER PUBLICATIONS

Payne et al. (doc. "Multiple frequency range Imaging to Remove Measurement Ambiguity"), (Year: 2009).*
(Continued)

*Primary Examiner* — Assres H Woldemaryam
(74) *Attorney, Agent, or Firm* — PRICE HENEVELD LLP (57) ABSTRACT

A time-of-flight, ToF, camera for measuring distance information for objects of a scene. The ToF camera comprises a light source for illuminating the objects, an image sensor for acquiring light signals reflected from the objects, a processing unit for processing first portions of the reflected light signals modulated with oscillations of a first frequency, and for processing second portions of the reflected light signals modulated with oscillations of a second frequency. The second frequency is higher than the first frequency and a second distance measurement value range is smaller than a first distance measurement value range. The second frequency is a non-integer multiple of the first frequency. The processing unit is adapted to restrict, on the basis of a spacing, the determining of the second distance measurement value range to the zeroth repetition of a predetermined number of repetitions of the first distance measurement value range.

19 Claims, 6 Drawing Sheets

(56) References Cited

U.S. PATENT DOCUMENTS

| | | | |
|---|---|---|---|
| 2014/0340569 A1* | 11/2014 | Raskar | G01S 17/894 348/370 |
| 2016/0047913 A1 | 2/2016 | Lamesch et al. | |
| 2016/0116594 A1* | 4/2016 | Xu | G01S 17/32 356/5.1 |
| 2016/0295193 A1* | 10/2016 | Van Nieuwenhove | H04N 13/239 |
| 2016/0334509 A1* | 11/2016 | Gruenwald | H04B 5/48 |
| 2016/0365846 A1* | 12/2016 | Wyland | H03K 5/1565 |
| 2017/0329012 A1* | 11/2017 | Büttgen | G01S 7/4914 |
| 2018/0011195 A1* | 1/2018 | Perry | G06F 17/10 |
| 2018/0278910 A1* | 9/2018 | Schoenberg | G01S 17/42 |
| 2018/0292516 A1* | 10/2018 | Xu | G01S 17/10 |
| 2019/0056482 A1* | 2/2019 | Nagai | G01S 7/4911 |
| 2019/0219696 A1* | 7/2019 | Xu | G01S 7/4915 |

FOREIGN PATENT DOCUMENTS

| | | | | |
|---|---|---|---|---|
| DE | 102013207653 | | 11/2013 | |
| DE | 102014204423 | | 9/2015 | |
| DE | 202015009250 | | 1/2017 | |
| DE | 102017106076 | | 7/2018 | |
| DE | 102017106078 | | 7/2018 | |
| EP | 3370078 | | 9/2018 | |
| WO | WO-2017025885 A1 * | 2/2017 | | G01S 17/34 |

OTHER PUBLICATIONS

Document date for "Multiple frequency range Imaging to Remove Measurement Ambiguity" (Year: 2009).*

Payne, Andrew et al., "Multiple frequency range imaging to remove measurement ambiguity," 9th Conference on Optical 3-D Measurement Techniques, Jul. 1, 2009-Jul. 3, 2009, Vienna, Austria.

* cited by examiner

MULTIPATH AND NOISE REDUCTION FOR TIME-OF-FLIGHT CAMERAS

CROSS-REFERENCE TO FOREIGN PRIORITY APPLICATION

The present application claims the benefit under 35 U.S.C. §§ 119(b), 119(e), 120, and/or 365(c) of PCT/EP2020/072532 filed Aug. 11, 2020, which claims priority to German Application No. DE 10 2019 122 891.3 filed Aug. 27, 2019.

FIELD OF THE INVENTION

The invention relates to a time-of-flight, ToF, camera for measuring distance information for objects in a scene and a corresponding ToF method.

BACKGROUND OF THE INVENTION

Light propagates at a speed approaching 300,000 kilometers per second. By measuring the travel time of light between two points very precisely, it is possible to calculate the distance between them. This principle forms the basis of the distance measurement techniques used in so-called time-of-flight, ToF, cameras. A ToF camera comprises a light source and an image sensor. The light source emits a modulated light signal that reflects off objects in the scene, and the ToF camera measures the time between the emission and the arrival of the reflected light signal at the image sensor. For each pixel (or for a subset of pixels) of the image sensor, a distance of the light-reflecting objects to the ToF camera that is calculated from the measured travel time is then output.

In addition to distance values, some ToF cameras also generate color or brightness values (and possibly other values, such as confidence values or the like), which can then also be output. ToF cameras, which are often also referred to as "active cameras" because they are equipped with their own light source, are used in a wide range of applications, e.g., in robotics, industrial automation, logistics, and medicine, as well as in various areas of the "smart factory".

The accuracy of the ToF method depends on how precise the time measurement is. Since the delay time of the light is only about 3.3 nanoseconds per meter, the resolution of the time measurement must be correspondingly high. In the so-called pulse modulation, the light source of the ToF camera emits a light pulse at a point in time $t_0$ and simultaneously starts a high-precision time measurement. If the light reflected from an object in the scene then arrives in the camera at a point in time $t_1$ the distance to the object can be determined directly from the measured travel time. $t_1-t_0$ as $d=c/2 \cdot (t_1-t_0)$, wherein c indicates the speed of light. Alternatively, however, a sinusoidal modulation of the light signal can be used, in which case the distance values are derived from the phase shift between the outgoing and incoming light signals. This method is also referred to in the literature as the continuous modulation, or continuous wave (CW), method.

In practice, both pulse modulation and CW methods as well as mixed forms of both are used:

For example, in a known process, a rectangular light pulse of duration $t_p$ is emitted and at the same time a first electronic shutter is opened for the duration of the light pulse. The reflected light arriving in the ToF camera during this time is stored as a first electrical charge $S_1$. Now the first shutter is closed and a second shutter—at the time the light source is switched off—is also opened for the duration $t_p$. The reflected light arriving in the ToF camera during this time is stored as a second electrical charge $S_2$. Since the light pulse is very short, this process is repeated several thousand times until the set exposure time is over. Subsequently, the integrated electrical charges $S_1$ and $S_2$ are read out.

As a result, two partial measurement images are obtained, which show for each pixel the integrated electric charge $S_1$ and $S_2$, respectively. In the $S_1$ partial measurement image, the near objects of the scene are brighter, because with increasing distance less and less reflected light reaches the ToF camera as long as the first shutter is still open. With the $S_2$ measurement, on the other hand, it is exactly the opposite. Here, close objects are dark because the second shutter only opens when the light has already been traveling for a while. The ratio of the integrated electrical charges $S_1$ and $S_2$ thus changes depending on the distance the emitted and reflected light has traveled. Thus, the distance to the object for each pixel can be calculated as $$d = \frac{c}{2} \cdot t_p \cdot \frac{S_2}{S_1 + S_2}, \quad (1)$$

wherein c again indicates the speed of light. In this method, the distance measurement is thus based on the measurement of the phase position of reflected rectangular pulses.

The smallest measurable distance is measured when all charge during the early shutter time is stored as $S_1$ and no charge during the delayed shutter time is stored as $S_2$, i.e., $S_2=0$. Equation (1) then gives d=0. In contrast, the largest measurable distance is measured just when all charge is stored as $S_2$ and no charge is stored as $S_1$, i.e., $S_1=0$. In this case, equation (1) gives $$d = \frac{c}{2} \cdot t_p.$$

From this it can also be seen that the light pulse width determines the maximum measurable distance in this method. If, for example, $t_p$ is 47 nanoseconds, distances from 0 to 7 meters can be measured.

In addition to the precision of the time measurement, there are a number of influencing factors that have an effect on the distance measurements of a ToF camera and can limit the measurement accuracy. For example, the above-mentioned methods usually assume that the modulated light signals are completely sinusoidal or rectangular. In practice, however, this is only approximately true due to the hardware, and the deviation of the real signals from the theoretical assumption leads to a systematic phase error $\varphi_w$ (also referred to as "wiggling" error in the literature). Other sources of error are the so-called phase noise, which is independent of the modulation frequency, and multipath effects. The latter result from the fact that often in reality not only the once-reflected light required for distance measurement (which travels on a direct path from the camera to an object in the scene and back again) is measured, but that the actually measured light is typically distorted by the superposition of a large number of stray light components and light components reflected at further objects. This also leads to an incorrectly calculated phase shift and thus to incorrect distance measurements—for example, objects in the scene can appear distorted or shifted in the measured distance image (often referred to as the "depth image") and planar surfaces can appear curved.

A variant of the multipath effects is the so-called stray light. Here, incident modulated light is scattered by the lens, primarily by the lens surfaces. For example, light from very well illuminated objects at close range can be scattered onto pixels of the image sensor that are actually supposed to image other, more distant objects. The superposition of the light paths, therefore, takes place on the pixels of the image sensor.

In view of these problems, it would, therefore, be desirable to provide a ToF camera and a ToF method in which the influence of one or more, preferably all, of the aforementioned sources of error on the range measurements can be reduced as far as possible.

SUMMARY OF THE INVENTION

It is an object of the invention to provide a time-of-flight, ToF, camera, which allows to reduce the influence of one or more sources of error, e.g., wiggling errors, phase noise, or multipath effects (including stray light), on the distance measurements. Furthermore, it is an object of the invention to provide a corresponding ToF method.

According to a first aspect of the invention, there is provided a time-of-flight, ToF, camera for measuring distance information for objects of a scene, the ToF camera comprising:

a light source for emitting modulated light signals for illuminating the objects;

an image sensor for acquiring light signals reflected from the objects;

a processing unit for processing first portions of the reflected light signals modulated with oscillations of a first frequency to determine first distance measurement values in a first distance measurement value range that is dependent on the first frequency, and for processing second portions of the reflected light signals modulated with oscillations of a second frequency to determine second distance measurement values in a second distance measurement value range that is dependent on the second frequency, wherein the second frequency is higher than the first frequency and the second distance measurement value range is smaller than the first distance measurement value range, wherein the processing unit is adapted, in determining the second distance measurement values, to resolve ambiguities of the second distance measurement value range within the first distance measurement value range based on the first distance measurement values and to generate a distance measurement image on the basis of only the second distance measurement values, and an output and/or storage unit for outputting and/or storing the distance measurement image, wherein the second frequency is a non-integer multiple of the first frequency such that the end of the zeroth repetition of the first distance measurement value range lies within a repetition of the second distance measurement value range and spaced from the end thereof, wherein the processing unit is adapted to restrict, on the basis of the spacing, the determining of the second distance measurement value range to the zeroth repetition of a predetermined number of repetitions of the first distance measurement value range.

The invention is based on the inventors' realization that modulating the light signals used for measurement at a higher frequency not only reduces the distance measurement value range compared to a lower modulation frequency, but that this simultaneously leads to a beneficial reduction in wiggling error, phase noise, and multipath effects (including stray light)—by a factor essentially equal to the ratio between the two frequencies compared to a lower modulation frequency. On the other hand, however, the reduced distance measurement value range measurements has the disadvantage that it allows unambiguous distance measurements only for scenes with correspondingly shallower depths. For deeper scenes, ambiguity occurs in the distance measurement due to the periodicity of the modulation. The invention resolves this conflict by providing distance measurements with two different modulation frequencies: a lower first frequency in first portions of the modulated light signals and a higher second frequency in second portions of the modulated light signals. When measuring at the first frequency, the wiggling error, phase noise, and multipath effects (including stray light) are greater. However, due to the larger distance measurement value range, unique distance measurements can be determined for a deeper scene. According to the invention, these first distance measurement values are then used to resolve, based on them, ambiguities (repetitions of the second distance measurement value range) when measuring with the second frequency. In this way, unambiguous second distance measurement values can be determined with reduced wiggling error, phase noise, and multipath effects (including stray light). As a result of the ToF distance measurement according to the invention, it is then possible to output and/or store a distance measurement image that has been generated on the basis of only the second distance measurement values. Finally, by restricting the determining of the second distance measurement values to the zeroth repetition of the first distance measurement value range, the susceptibility to erroneous measurements due to objects outside the zeroth repetition of the first distance measurement value range (also known as depth aliasing) can be reduced. As the inventors have recognized, such a constraint can be implemented in a simple and efficient manner by using a first frequency and a second frequency that are in a non-integer relationship to each other, and by providing at the end of the zeroth repetition of the first distance measurement value range a "phase offset" between that end and the end of the associated second distance measurement value range. This "phase offset" between the two distance measurement value ranges then makes it possible, for example, to distinguish distances to an object within the zeroth repetition of the first distance measurement value range from distances to an object within the first repetition of the first distance measurement value range.

The light source advantageously emits the modulated light into the field of view of the ToF camera. For example, LEDs (light emitting diodes) or LDs (laser diodes) can be used. In many applications, infrared light is used as illumination. This has the advantage that it is visually inconspicuous and, in particular, has little or no effect on the color or brightness values to be additionally recorded.

According to an advantageous embodiment, in resolving the ambiguities, a repetition of the second distance measurement value range is selected within the first distance measurement value range value by means of a scaling factor that is dependent on a ratio value. The ratio value is preferably determined on the basis of the second distance measurement value range and a difference between the first distance measurement value and an intermediate value of the associated second distance measurement value, wherein for the intermediate value it is not yet determined in which repetition of the second distance measurement value range it lies.

According to an advantageous embodiment, the restricting the determining of the second distance measurement values to the zeroth repetition of the first distance measurement value range occurs on the basis of the ratio value. If the ratio value is determined on the basis of the second distance measurement value range and the difference between the first distance measurement value and an intermediate value of the associated second distance measurement value, it reflects the aforementioned "phase offset" between the two distance measurement value ranges. Thus, the ratio value can be used in a simple and efficient manner to restrict the second distance measurement values to the zeroth repetition of the first distance measurement value range.

According to an advantageous embodiment, the restricting the determining of the second distance measurement values to the zeroth repetition of the first distance measurement value range comprises a comparison with a threshold value, wherein the threshold comparison is dependent on the value of the decimal portion of the ratio value. Due to the aforementioned "phase offset" between the two distance measurement value ranges, the decimal portion of the ratio value differs depending on whether an object lies within the zeroth repetition of the first distance measurement value range or within another repetition of a predetermined number of repetitions of the first distance measurement value range. By a threshold value comparison that is dependent on the decimal portion of the ratio value, the restricting of the second distance measurement values to the zeroth repetition of the first distance measurement value range can be realized in a simple and efficient way.

According to an advantageous embodiment, the restricting the determining of the second distance measurement values to the zeroth repetition of the first distance measurement value range comprises a shifting of the ratio value by an offset, wherein the threshold comparison is dependent on the value of the decimal portion of the shifted ratio value, wherein the offset preferably corresponds to half of the threshold value. An appropriate choice of the offset as well as the threshold value can influence the robustness of the detection of mismeasurements by objects outside the zeroth repetition of the first distance measurement value range.

According to an advantageous embodiment, the spacing of the ends lies in a range from one half to one tenth, preferably in a range from one half to one fifth, more preferably in a range from one half to one third, of the second distance measurement value range. Advantageously, the spacing of the ends depends on how many repetitions of the first distance measurement value range one wishes to distinguish (predetermined number of repetitions). For example, for distinguishing four repetitions of the first distance measurement value range, it is particularly advantageous if the spacing of the ends lies at one fourth of the second distance measurement value range, and for distinguishing five repetitions of the first distance measurement value range, it is particularly advantageous if the spacing of the ends lies at one fifth of the second distance measurement value range. In general, it is preferred that for discriminating a predetermined number of N of repetitions of the first distance measurement value range, the distance of the ends lies at 1/N of the second distance measurement value range.

According to an advantageous embodiment, the first frequency lies in a range from 5 MHz to 25 MHz, preferably in a range from 10 MHz to 20 MHz, particularly preferably, at 15 MHz, and the second frequency lies in a range from 50 MHz to 150 MHz, preferably in a range from 75 MHz to 125 MHz, particularly preferably, at 100 MHz.

According to an advantageous embodiment, the oscillations of the first frequency and/or the oscillations of the second frequency are periodic sequences of square pulses, preferably with a pulse-pause ratio of 1/2. The advantage of using pulse-modulated light signals is that a high energy can be emitted in a very short time. Thus, the influence of background illumination, which can also affect the ToF distance measurement, can be reduced and the signal-to-noise ratio can be improved, since a high temporal and spatial energy density can reduce the acquisition time and thus the time range for the integration of the background light. At the same time, however, low average powers are achieved. This is particularly important for eye safety, which is often the limiting criterion for many measurement applications. In addition, it is advantageous to use normal charge coupled device (CCD) or complementary metal oxide semiconductor (CMOS) sensors, which are cheaper to manufacture and have a large light-sensitive area. The use of a pulse-pause ratio (also referred to in the literature as duty cycle) of 1/2 also has the advantage that two or more repetitions of the second distance measurement value range directly follow each other within the first distance measurement value range without overlapping. In this way, there are no gaps in the depth where measurement with the higher second frequency is not possible, nor do the repetitions of the second distance measurement value range overlap, which would complicate the selection of the "correct" second distance measurement value range based on the determined first distance measurement values.

According to an advantageous embodiment, the ToF camera is adapted, by integration of the reflected light signals over a plurality of integration phases that are offset in time with respect to one another, to generate a plurality of partial measurement images at different phase positions from the first sections of the reflected light signals and/or from the second sections of the reflected light signals, wherein the first distance measurement values and the second distance measurement values are determined from the partial measurement images. Determining a distance measurement value based on a modulated light signal can in principle be done using two partial images, as described above. However, in addition to the distance of an object to be measured, there are two other unknowns in the ToF method, namely the reflectivity of the object and the background illumination. Thus, since there are three degrees of freedom in total, it is advantageous to use more than two partial measurement images in the distance measurement. For example, three partial measurement images can be generated from both the first sections of the reflected light signals and the second sections of the reflected light signals. This gives a total of six partial measurement images (three for the lower first frequency and three for the higher second frequency), by means of which a direct solution to the problem based on the integrated electric charges can be obtained. In this case, the integration phases, which are offset in time with respect to one another, can be realized by means of three electronic shutters which are opened at corresponding times. Advantageously, the integration phases each correspond to the duration of the square pulses and/or the time offsets each correspond to two thirds of the duration of the square pulses.

In an advantageous variant, three partial measurement images are generated from the second sections of the reflected light signals and only one partial measurement image is generated from the first sections of the reflected light signals, which gives a total of four partial measurement images (one for the lower first frequency and three for the higher second frequency). Assuming that the reflectivity of the objects and the background illumination does not change between the measurement with the lower first frequency and the measurement with the higher second frequency, but one wants to have an independent distance measurement for each frequency, the number of degrees of freedom for the two frequencies is reduced from two times three equals six to only four degrees of freedom. Thus, the problem can be solved unambiguously on the basis of four partial measurement images. Since the measurement with the higher second frequency, as described, reduces the wiggling error, the phase noise, and the multipath effects (including the stray light), one obtains better results with less effort if one spares the "unnecessary" partial measurement images at the lower first frequency.

According to an advantageous embodiment, the light source is further adapted to emit the second sections, which are to be processed for determining the second distance measurement values, temporally before the first sections, which are to be processed for determining the first distance measurement values. Indeed, in many cases it is desired to synchronize the distance measurement with an external event (e.g., the feeding of a target in industrial automation applications). For this purpose, it is necessary to be able to control the measurement timing as precisely as possible, for example, by means of a trigger signal. Since, according to the invention, the distance measurement image is generated on the basis of only the second distance measurement values, it is therefore advantageous if the second sections of the modulated light signals, which are to be processed for determining the second distance measurement values, are transmitted temporally before the first sections of the modulated light signals, which are to be processed for determining the first distance measurement values, since this ensures that the measurement timing of the second distance measurement values lies as close as possible to the desired trigger timing.

According to another advantageous embodiment, the light source is further adapted to emit the first sections, which are to be processed for determining the first distance measurement values, and the second sections, which are to be processed for determining the second distance measurement values, in a temporally interleaved sequence. A problem in distance measurement can arise if an object in the scene moves during distance measurement, in which case lateral or upward or downward movements in particular can be problematic. If, for example, such a movement of a foreground object during the distance measurement reveals part of the scene background, the resolving of the ambiguities according to the invention can fail if, for example, the determined first distance measurement values still represent the foreground object, but the determined second distance measurement values would already have to indicate the distance of the scene background. This can be avoided by transmitting the first sections to be processed to determine the first distance measurement values and the second sections to be processed to determine the second distance measurement values in a temporally interleaved sequence, so that the measurement timing of the first distance measurement values and the measurement timing of the second distance measurement values are essentially the same. In this way, larger motion artifacts can be avoided or at least reduced at the expense of a possibly slightly increased motion blur.

According to yet another advantageous embodiment, the ToF camera is adapted, in emitting the modulated light signals, to operate the light source during the second portions with a longer exposure time and/or with a higher current or voltage than during the first sections. The reason for this is the differences in the operating point of the ToF camera at the different high frequencies. In particular, due to the finite rise times of drivers and the light source (e.g., LED or LD), the light source can only output lower light power at the higher second frequency. This results in higher noise. Since it is the distance measurement at the higher second frequency that carries the detailed information, it is advantageous to compensate for this effect as much as possible. This can be done by using a longer exposure time and/or by operating the light source with a higher current or voltage during the second sections.

According to yet another advantageous embodiment, the processing unit is adapted, in determining the first distance measurement values and/or the second distance measurement values, to perform a correction with respect to a frequency-dependent offset value. The use of higher frequencies is typically associated with a higher power dissipation of the electronics. The (briefly) higher temperature of the components provides for different signal propagation times, e.g., in the drivers. These times add to the light travel times to be measured and falsify the result. This effect can be eliminated or at least reduced by a suitable calibration of the propagation time difference and a correction by means of a frequency-dependent offset value.

According to an advantageous embodiment, the processing unit is further adapted to process third portions of the reflected light signals modulated with oscillations of a third frequency for determining third distance measurements in a third distance measurement value range that is dependent on a third frequency, wherein the third frequency is higher than the first frequency and lower than the second frequency and the third distance measurement value range is smaller than the first distance measurement value range and larger than the second distance measurement value range, wherein the processing unit is adapted, in determining the third distance measurement values, to resolve ambiguities of the third distance measurement value range within the first distance measurement value range on the basis of the first distance measurement values and, in determining the second distance measurement values, to resolve ambiguities of the second distance measurement value range within the third distance measurement value range on the basis of the third distance measurement values.

By using such a "cascading" of different high frequencies, an advantageous robustness against pronounced phase noise, multipath effects (including stray light) and motion artifacts results. In addition to the additional third frequency, one or more other frequencies can, of course, be provided that lie between the first and second frequencies (for example, below the third frequency or above it, or partly below and partly above it). The selection of the "correct" distance measurement value range measurement values that is dependent on a respective frequency when resolving the ambiguities is then carried out in each case on the basis of distance measurement values determined for a smaller frequency, preferably the next smaller frequency.

According to an advantageous embodiment, the ToF camera further comprises an interface for parameterizing the ToF camera, wherein a number of frequencies used for distance measurement and/or a ratio of at least two of the first frequency, the second frequency and, if provided, the third frequency can be set by the parameterization. In this way, the ToF camera can be adapted very flexibly to the existing conditions, e.g., the expected motion artifacts etc., can be adapted.

According to another aspect of the invention, there is provided a time-of-flight, ToF, method for measuring range information for objects of a scene, the ToF method comprising:

emitting modulated light signals for illuminating the objects;

capturing light signals reflected from the objects;

processing first portions of the reflected light signals modulated with oscillations of a first frequency to determine first distance measurements in a first distance measurement value range that is dependent on the first frequency, and processing second portions of the reflected light signals modulated with oscillations of a second frequency to determine second distance measurements in a second distance measurement value range that is dependent on the second frequency, wherein the second frequency is higher than the first frequency and the second distance measurement value range is smaller than the first distance measurement value range, wherein the processing, in determining the second distance measurement value range, resolves ambiguities of the second distance measurement value range within the first distance measurement value range based on the first distance measurement value range and generates a distance measurement image on the basis of only the second distance measurement value range, and outputting and/or storing the distance measurement image, wherein the second frequency is a non-integer multiple of the first frequency such that the end of the zeroth repetition of the first distance measurement value range lies within a repetition of the second distance measurement value range and spaced from the end thereof, wherein the processing restricts, on the basis of the spacing, the determining of the second distance measurement value range to the zeroth repetition of a predetermined number of repetitions of the first distance measurement value range.

It is understood that the ToF camera of the present disclosure have similar and/or identical preferred embodiments, particularly as defined in the dependent claims.

It is understood that a preferred embodiment of the invention can also be any combination of the dependent claims with the corresponding independent claim.

BRIEF DESCRIPTION OF THE DRAWINGS

Preferred embodiments of the invention are described in more detail below with reference to the accompanying Figures, wherein.

DETAILED DESCRIPTION OF THE EMBODIMENTS

In the Figures, identical or corresponding elements or units are each given identical or corresponding reference signs. If an element or unit has already been described in connection with a Figure, a detailed description can be omitted in connection with another Figure.

Figure 1:
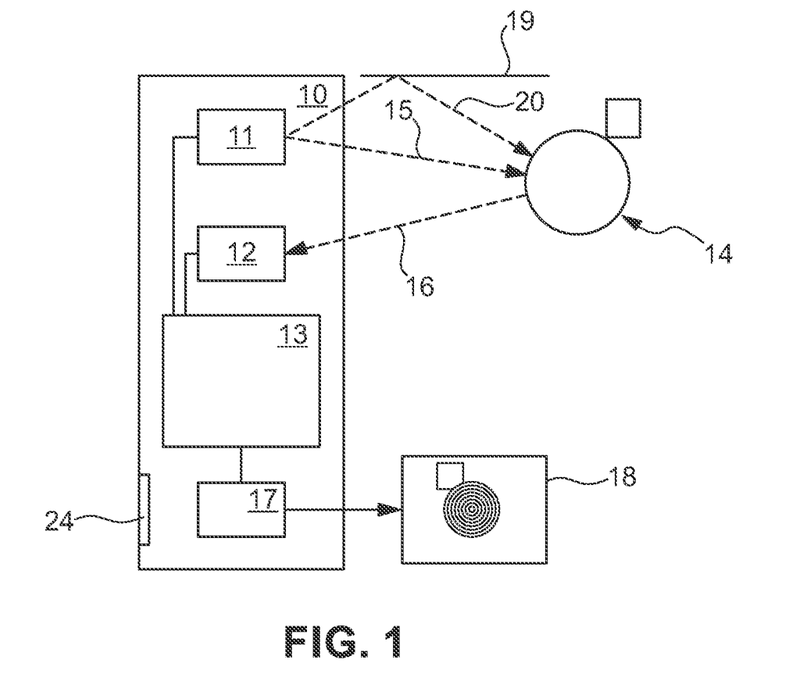
FIG. 1 shows schematically and exemplarily the structure of a ToF camera.

FIG. 1 shows schematically and exemplarily the structure of a ToF camera 10 for measuring distance information for objects 14 of a scene, such as can be used in robotics, industrial automation, logistics, and medicine, or in various areas of the "smart factory," The ToF camera 10 includes a light source 11 for emitting modulated light signals 15 for illuminating the objects 14, and an image sensor 12 for acquiring light signals 16 reflected from the objects 14.

The light source 11 advantageously emits the light into the field of view of the ToF camera 10. For example, LEDs (light emitting diodes) or LDs (laser diodes) can be used. In this embodiment, infrared light is used as illumination. This has the advantage that it is visually inconspicuous and, in particular, has little or no effect on the color or brightness values to be additionally recorded.

Figure 2:
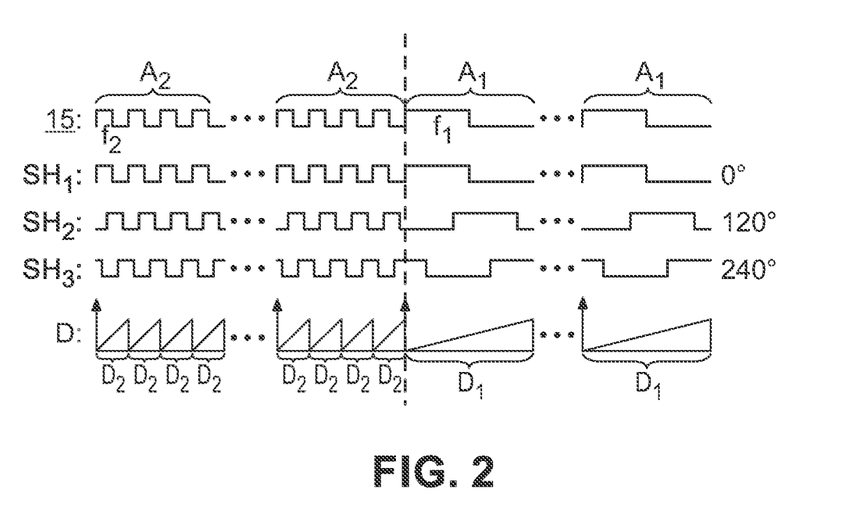
FIG. 2 shows schematically and exemplarily how the modulation of the light signals can preferably be realized.

How the modulation of the light signals 15 can preferably be realized will now be described with reference to FIG. 2. In this Figure, the modulated light signals 15 emitted by the light source 11 for illuminating the objects 14 of the scene are shown in the top row. From the illustration, it can be seen that the modulated light signals 15 comprise first sections $A_1$ modulated with oscillations of a first frequency $f_1$ frequency, and second sections $A_2$ modulated with oscillations of a second frequency $f_2$. The three points between the respective first and second sections $A_1$ resp. $A_2$ indicate that the sections are repeated many times, e.g., several thousand times, until the set exposure time is over.

In this embodiment, the oscillations are square pulses with a pulse-pause ratio of 1/2, and the second frequency $f_2$ is higher than the first frequency $f_1$. In particular, the second frequency $f_2$ in this embodiment is an integer multiple N of the first frequency, in this case, four times the first frequency $f_1$. The first sections $A_1$ each comprise only one square pulse and the associated pause, while the second sections $A_2$ each comprise a periodic sequence consisting of N rectangular pulses and the associated pauses. The modulated light signals 15 comprising the first and second sections $A_1$ and $A_2$ are reflected from the objects 14 of the scene, and the reflected light signals 16 are acquired by the image sensor 12.

The ToF camera 10 shown in FIG. 1 further comprises a processing unit 13 for processing the first and second sections $A_1$ and $A_2$ of the reflected light signals 16 for determining first and second distance measurements $d_1$ and $d_2$. In this regard, the first distance measurement values $d_1$ lie in a first distance measurement value range $D_1$ and the second distance measurement values $d_2$ lie in a second distance measurement value range $D_2$. This is shown in the bottom row of FIG. 2. As can be seen, the two distance measurement value ranges $D_1$ and $D_2$ depend on the frequency $f_1$ and $f_2$, respectively, wherein, due to the fact the second frequency $f_2$ is higher compared to the first frequency $f_1$, the second distance measurement value range $D_2$ is smaller—namely also by a factor of four—than the first distance measurement value range $D_1$. As an example, assume that the duration $t_{p1}$ of the square pulses in the first sections $A_1$ is 47 nanoseconds, and that the duration $t_{p2}$ of the square pulses in the second sections $A_2$ is one fourth of this, i.e., 11.75 nanoseconds. Then it is possible to measure 7 meters with the first distance measurement value range $D_1$, while only 1.75 meters can be measured with the second distance measurement value range $D_2$.

The use of the second frequency $f_2$ in the second sections $A_2$, which is by a factor N=4 higher compared to first frequency $f_1$ in the first sections $A_1$, has the consequence that the second distance measurement value range $D_2$ within the first distance measurement value range $D_1$ is ambiguous. In other words, the second distance measurement value range $D_2$ repeats itself within the first distance measurement value range $D_1$ and it is not possible to determine from the phasing of the square pulses in the second sections $A_2$ of the light signals 16 reflected from the objects 14 of the scene the repetition of the second distance measurement value range $D_2$ in which a respective object 14 is located. To stay with the above example, it cannot be unambiguously determined whether the object 14 is in a distance measurement value range from 0 to 1.75 meters (zeroth repetition), or in a range from 1.75 to 3.5 meters (first repetition), or in a range from 3.5 to 5.25 meters (second repetition), or in a range from 5.25 to 7 meters (third repetition).

According to the invention, the processing unit 13 of the ToF camera 10 is now adapted to, in determining the second distance measurement values $d_2$, resolve the ambiguities of the second distance measurement value range $D_2$ within the first distance measurement value range $D_1$ on the basis of the first distance measurement values $d_1$ and to generate a distance measurement image 18 (see FIG. 1) on the basis of only the second distance measurement values $d_2$. The ToF camera 10 further comprises an output and/or storage unit 17 for outputting and/or storing the distance measurement image 18.

Before we explain in more detail, with reference to FIG. 6, how the resolving of the ambiguities can be realized in a preferred manner, the advantages of the described approach will first be explained in more detail. As mentioned, the invention is based on the inventors' realization that using the higher second frequency $f_2$ in the second sections $A_2$ of the modulated light signals 15 on the one hand reduces the second distance measurement value range $D_2$ but that, at the same time, this results in a beneficial reduction in wiggling error, phase noise and multipath effects (including stray light)—compared to the lower first frequency $f_1$ in the first sections $A_1$ of the modulated light signals 15 by a factor N which is essentially equal to the ratio between the two frequencies $f_1$ and $f_2$ (i.e. four in this case).

To make this understandable, we refer again to FIG. 1, in which, in the scene adjacent to the objects 14, a wall or other larger object 19 is shown. As described, the light source 11 emits the modulated light signals 15 for illuminating the objects 14, and the image sensor 12 acquires the light signals 16 reflected from the objects 14. While the light signals 15 shown travel in a direct path from the light source 11 to the objects 14 and from there to the image sensor 12, it is also possible that at least a portion 20 of the modulated light signals 15 emitted by the light source 11 is reflected off the wall or larger object 19 and travels from there in an indirect path to the objects 14 and back to the image sensor 12. This light component 20 reflected on an indirect path is superimposed on the light 15 reflected on a direct path, i.e., the image sensor 12 acquires a superposition of light that has traveled on different paths ("multipath") from the light source 11 to the image sensor 12. As explained, this leads to an incorrectly calculated phase shift and thus to incorrect distance measurements ("multipath effects").

Figure 3:
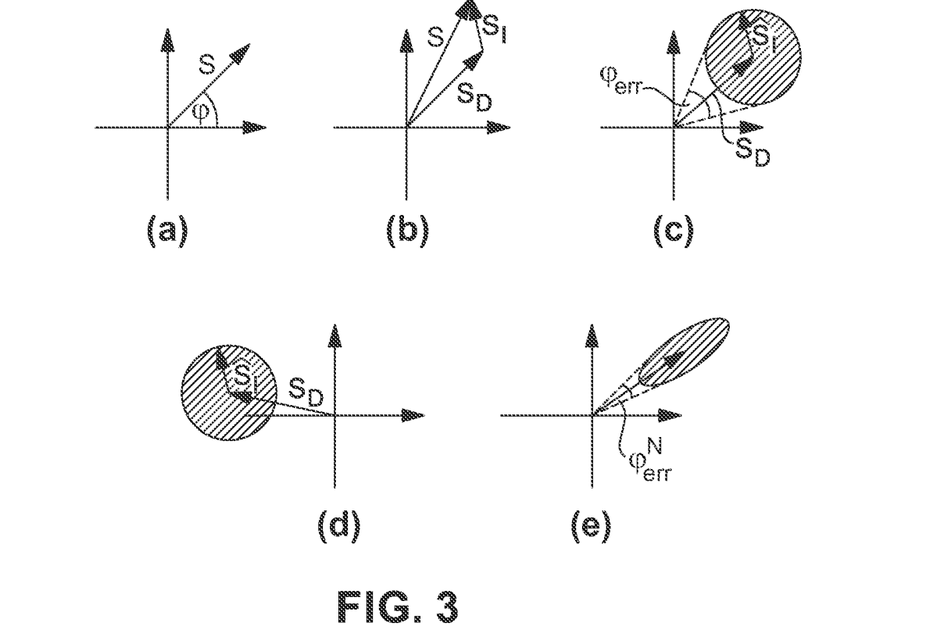
FIG. 3 shows schematically and exemplarily phase diagrams illustrating the multipath effects at different frequencies.

This effect can also be described approximately for the light signals 15 modulated with square pulses using the phase diagrams shown in FIG. 3. It is assumed here that the phase shift φ of the reflected light signals 16 incident on the image sensor 12 is proportional to the distance traveled, i.e. the distance to the respective object 14 is $$d = \frac{\varphi}{2\pi} \cdot \frac{c}{2f} \quad (2)$$

wherein c is the speed of light and f indicates the modulation frequency. FIG. 3 (a) shows the signal $S=\hat{S}e^{i\varphi}$ generated by the image sensor 12, wherein the amplitude $\hat{S}$ corresponds to the brightness (generated charge) and φ is a measure for the object distance d. If the image sensor 12 also receives light from the object 14 via an indirect path, then a direct signal $S_D$ and an indirect signal $S_I$ are superimposed to a total signal $S=S_D+S_I$. This is shown in FIG. 3 (b). If one allows for all possible phase positions of the indirect signal $S_I$ (i.e. it does not matter how long the indirect path is), but assumes a maximum amplitude of $\hat{S}_I$, then the total signal S lies within the circle shown in FIG. 3 (c). The angle $\varphi_{err}$ then describes the maximum measurement error of S with respect to $S_D$ which is caused by the indirect path.

With an N-fold increase of the modulation frequency f also the phase angle φ of the direct signal $S_D$ increases N-fold, since the causal signal propagation times remain unchanged. The area of the circle for the measurement error caused by the indirect path, however, does not change, since this is only defined by the maximum amplitude $\hat{S}_I$ of the indirect signal $S_I$. This is shown in FIG. 3 (d). Now, to compare the two cases, if the phase angle φ of the direct signal $S_D$ at the higher frequency is divided by the ratio N of the two frequencies, then graphically the case from FIG. 3 (d) is mapped to the phase angle φ of the direct signal $S_D$ at the lower frequency (the case from FIG. 3 (c)). Thus, as shown in FIG. 3 (e), the error circle becomes similar to an ellipse, wherein its area is reduced by a factor of 1/N. This then also reduces the maximum measurement error caused by the indirect path from $\varphi_{err}$ to $\varphi_{err}^N=\varphi_{err}/N$. The same then applies if the distance measurement is distorted by light received on several indirect paths.

Figure 4:
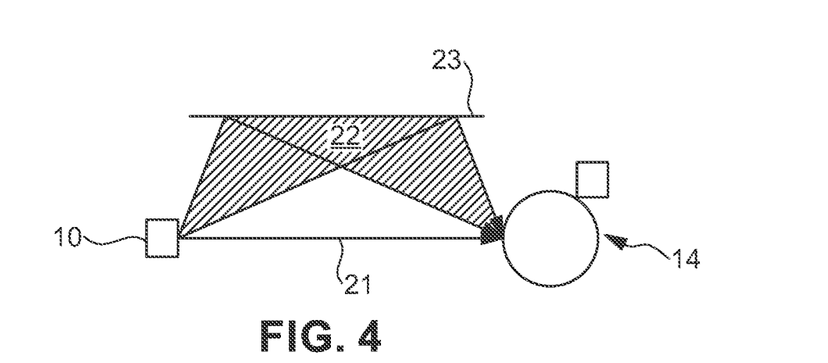
FIG. 4 shows schematically and exemplarily how an infinite number of indirect paths, which differ only slightly, are generated by a surface parallel—or nearly parallel—to the direct path.

In addition, a particularly favorable reduction of multipath effects results from the described procedure if an infinite number of indirect paths, which differ only slightly, are generated by a surface parallel—or nearly parallel—to the direct path. This is shown schematically and exemplarily in FIG. 4, wherein the direct path 21 runs directly between the ToF camera 10 and the objects 14 of the scene and the indirect paths run via the wall 23.

Figure 5:
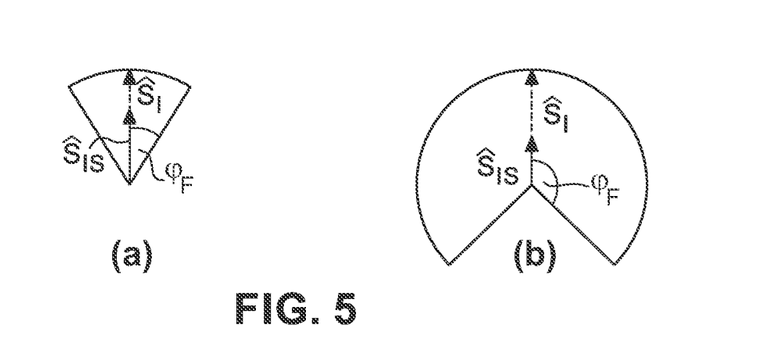
FIG. 5 shows schematically and exemplarily the multipath effects in the situation shown in FIG. 4.

In such a situation, the image sensor 12 thus receives, in addition to the light signal 16 reflected directly from the respective object 14, a superposition of the infinite number of light signals 22 reflected on the indirect paths via the wall 23. These each have a phase position which lies equally distributed in a phase range $\varphi^F$ which depends on the extent of the wall 23, i.e., the length of the area of the (approximately) parallel surface contributing to the indirect reflections. Comparing this now with the case where the same amount of light is reflected via a single indirect path (not shown in FIG. 4) across the center of the wall 23, one recognizes from FIG. 5 (a) that the amplitude $\hat{S}_{IS}$ of the total interference vector resulting from the superposition of the light signals 22 compared to the amplitude $\hat{S}_I$ of the light signal received via the single indirect path is reduced. Graphically, this result is obtained by considering that the resulting phase angle $\varphi_{IS}$ of the superposition corresponds to the phase angle $\varphi_I$ of the single indirect signal, and that the amplitude $\hat{S}_{IS}$ results as the mean value of the indirect signals, each mapped to the resulting phase angle $\varphi_{IS}=\varphi_I$. Thus, $\hat{S}_{IS}$ is always smaller than $\hat{S}_I$, wherein the larger is the phase range $\varphi^F$, the larger is the reduction (cf. FIG. 5 (b)).

As mentioned, the phase range $\varphi^F$ depends first of all on the extent of the wall 23. A corresponding increase of $\varphi^F$ can advantageously be achieved by increasing the modulation frequency f. Thus, an increase of the modulation frequency f in the described case, in which an infinite number of indirect paths are generated by a surface parallel—or nearly parallel—to the direct path, leads to a particularly favorable reduction of the multipath effects.

In addition to the reduction of multipath artifacts explained above, the described procedure reduces the wiggling error and the phase noise to a corresponding degree. As already explained in the introduction, in practice the oscillations of the modulated light signals are only approximately sinusoidal or rectangular due to the hardware, wherein the deviation of the real signals from the theoretical assumption leads to a systematic phase error $\varphi_w$ ("wiggling"). This error does not depend on the modulation frequency f, but it is mapped on the distance measurement value range D which depends on the frequency. Thus, with an N-fold increase of the modulation frequency f the standard deviation $\sigma_w^N$ of the wiggling error results to $\sigma_w^N=\sigma_w/N$, wherein $\sigma_w$ indicates the standard deviation of the wiggling error at the lower frequency. The same is true for the phase noise, which is also independent of the modulation frequency f, but is mapped on the distance measurement value range D which depends on the frequency. Here, too, for an N-fold increase of the modulation frequency f a reduction of the standard deviation of the phase noise of $\sigma_P^N=\sigma_P/N$ results, wherein $\sigma_P$ is the standard deviation of the phase noise at the lower frequency.

In the following, FIGS. 6 to 9 show schematically and exemplarily how the resolving of the ambiguities of the second distance measurement value range $D_2$ within the first distance measurement value range $D_1$ on the basis of the first distance measurement values $d_1$ can be realized in a preferred manner. For this purpose, FIG. 6 shows once again the first distance measurement value range $D_1$ already shown in the bottom row of FIG. 2 and—superimposed in the same representation—the second distance measurement value range $D_2$ which is ambiguous in the first distance measurement value range $D_1$ (however, with other ratios between the first frequency $f_1$ and the second frequency $f_2$). As explained, the second distance measurement value range $D_2$ is repeated within the first distance measurement value range $D_1$ and it is not possible to determine from the phase position of the square pulses in the second portions $A_2$ of the light signals 16 reflected from the objects 14 of the scene, the repetition of the second distance measurement value range $D_2$ in which a respective object 14 is located. This is accomplished only by the ambiguity resolve according to the invention.

Figure 6:
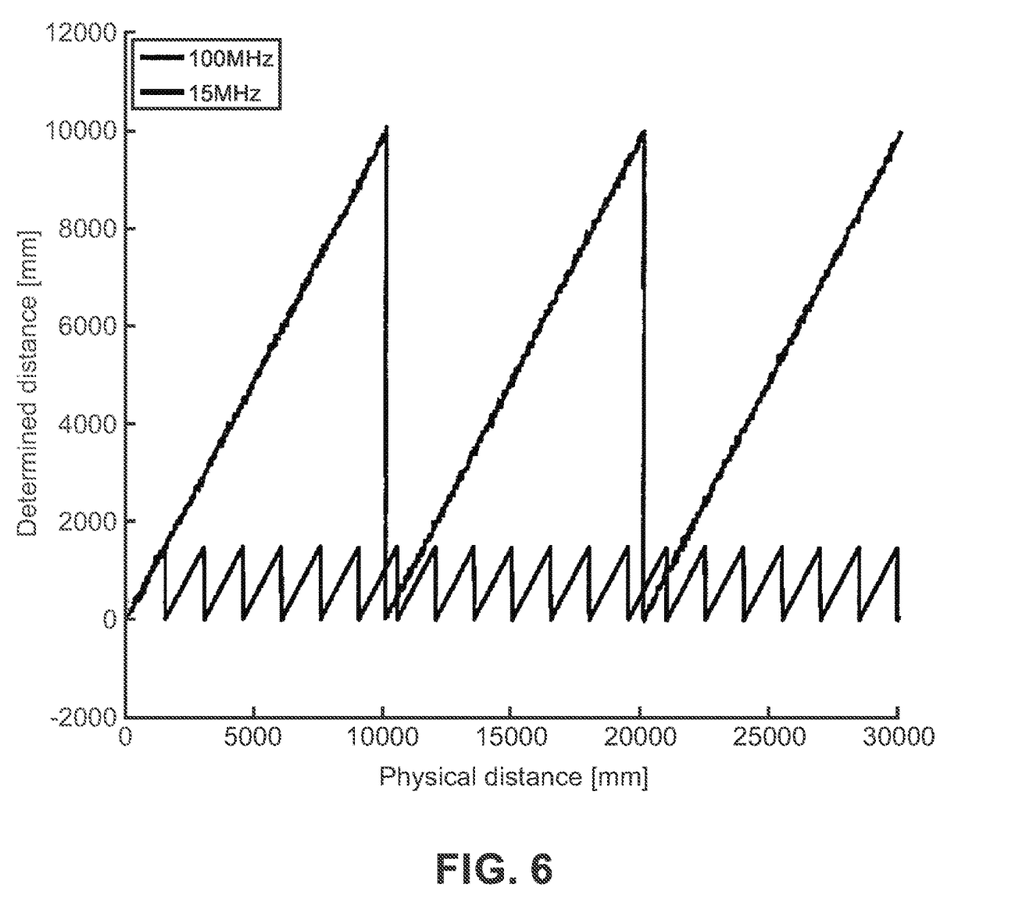
FIGS. 6-9 schematically and exemplarily show how the resolving of the ambiguities of the second distance measurement value range within the first distance measurement value range can be realized on the basis of the first distance measurement value range in a preferred manner and how the second distance measurement value range can be determined in such a way that the determining is restricted to the zeroth repetition of the first distance measurement value range.

In the example shown in FIG. 6, the first frequency $f_1$ lies at 15 MHz and the second frequency $f_2$ lies at 100 MHz. The second frequency $f_2$ is thus a non-integer multiple of the first frequency $f_1$, so that the end of the zeroth repetition of the first distance measurement value range $D_1$ lies within a repetition of the second distance measurement value range $D_2$ and spaced from the end thereof. This makes it possible to restrict, on the basis of the spacing, the determining of the second distance measurement values $d_2$ to the zeroth repetition of a predetermined number of repetitions of the first distance measurement value range $D_1$. This will be described below by way of example.

A preferred way of selecting the "correct" second distance measurement value range $D_2$ consists in that, in the resolving of the ambiguities, a repetition of the second distance measurement value range $D_2$ within the first distance measurement value range $D_1$ is selected by means of a scaling factor $\lfloor d'+0.5 \rfloor$ that is dependent on a ratio value d'. Therein, the ratio value d' is preferably determined on the basis of the second distance measurement value range $D_2$ and a difference between the first distance measurement value $d_1$ and an intermediate value $d_2^?$ of the associated second distance measured value $d_2$, wherein for the intermediate value $d_2^?$ it is not yet determined in which repetition of the second distance measurement value range $D_2$ it lies. In particular, the ratio value d' can be can be determined as follows $$d' = \frac{(d_1 - d_2^?)}{D_2} \tag{3}$$

and the selection of the repetition of the second distance measurement value range $D_2$ or the determining of the second distance measurement values $d_2$, respectively, is done based on the following equation $$d_2 = \lfloor d'+0.5 \rfloor \cdot D_2 + d_2^? \tag{4}$$

The ratio value d' can then also be used to restrict the determining of the second distance measurement values $d_2$ to the zeroth repetition of the first distance measurement value range $D_1$. In doing so, the restricting the determining of the second distance measurement values $d_2$ to the zeroth repetition of the first distance measurement value range $D_1$ preferably comprises a comparison with a threshold value T, wherein the threshold comparison is dependent on the value of the decimal portion of the ratio value d'. In particular, the second distance measurement values $d_2$ can be determined based on the following equation $$d_2 = \begin{cases} \lfloor d'+0.5 \rfloor \cdot D_2 + d_2^? & f\mathrm{mod}(d'+o, 1) < T \\ 0 & sonst \end{cases} \tag{5}$$

wherein f mod(x, y) denotes the floating point remainder of the division of the dividend x by the divisor y, o is an offset that is preferably equal to half the threshold value T, and the threshold value T preferably lies in a range $T \in [0, \ldots, 0.5]$.

This equation and the ambiguity resolve realized by it, respectively the restricting the determining of the second distance measurement values $d_2$ to the zeroth repetition of the first distance measurement value range $D_1$, are explained in more detail below in connection with FIG. 7 to 9.

Figure 7:
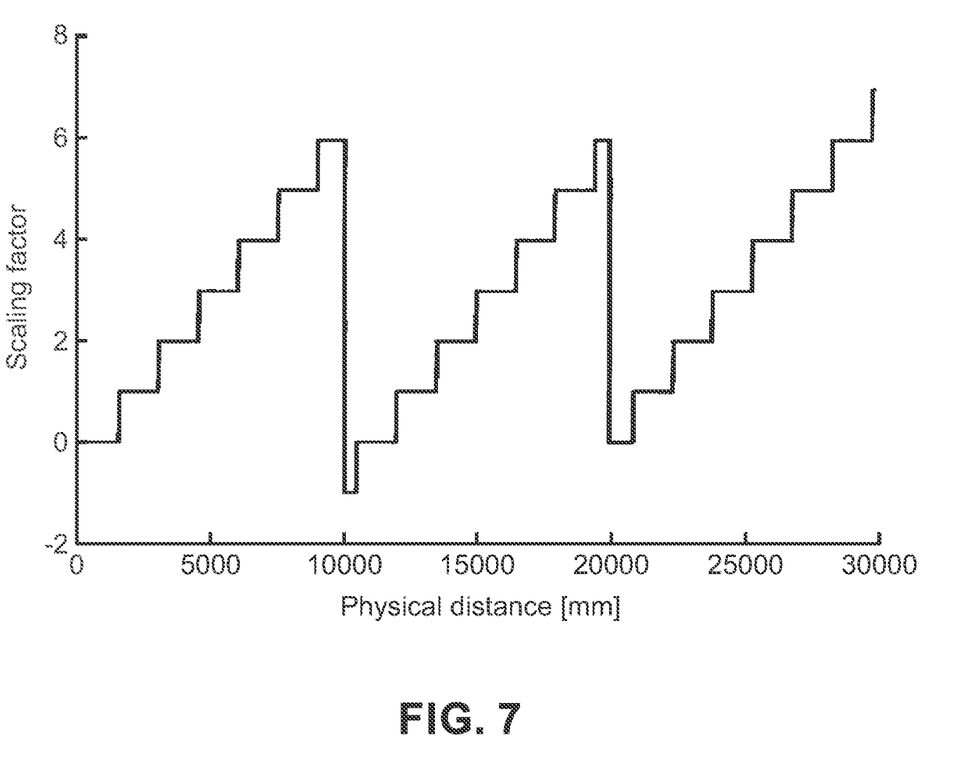

FIG. 7 shows the scaling factor $\lfloor d'+0.5 \rfloor$ which results for different values of the first distance measurement value $d_1$ and the intermediate value $d_2^?$ of the corresponding second distance measurement value $d_2$. As can be seen, the scaling factor $\lfloor d'+0.5 \rfloor$ within a repetition of the first distance measurement value range $D_1$ indicates the "correct" repetition of the second distance measurement value range $D_2$. With the help of equation (4), the "correct" second distance measurement values $d_2$ can be determined from this (as long as the objects 14 of the scene are only within the zeroth repetition of the first distance measurement value range $D_1$).

In order to restrict the determining of the second distance measurement values $d_2$ in deeper scenes to the zeroth repetition of the first distance measurement value range $D_1$, a comparison with a threshold value T can preferably be made—as described above—, wherein the threshold comparison is dependent on the value of the decimal portion of the ratio value. d'. This is shown in FIG. 8. As can be seen, due to the "phase shift" that results at the ends of the repetitions of the first distance measurement value range $D_1$ to the respective second distance measurement value range $D_2$ the decimal portion of the ratio value d' lies in respectively different value ranges between 0 and 1. Due to these differences, it is possible, despite the clearly recognizable noise of the decimal portion, to robustly distinguish with the help of the comparison with the threshold value T second distance measurement values $d_2$ from the zeroth repetition of the first distance measuring value range $D_1$ from second distance measurement values $d_2$ from a higher, e.g., second or third, repetition of a predetermined number of repetitions of the first distance measurement value range $D_1$. According to equation (5), the latter can then be set, for example, to the value 0 or to another uniquely identifiable value.

Figure 8:
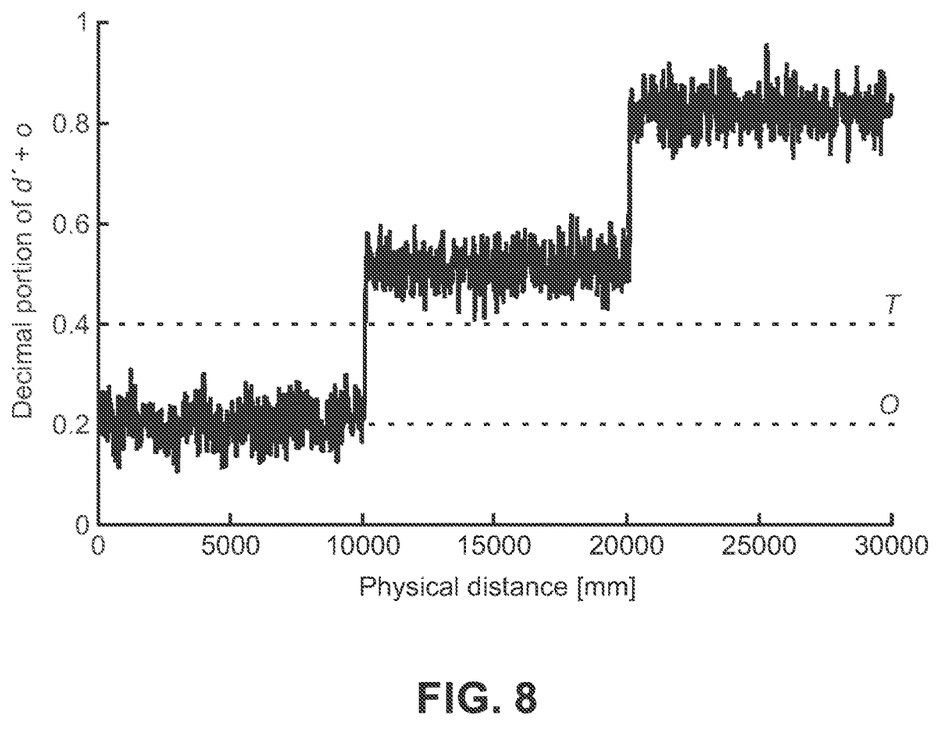

In the example shown in FIG. 8, the restricting the determining of the second distance measurement values $d_2$ to the zeroth repetition of the first distance measurement value range $D_1$ comprises shifting the ratio value d' by an offset o, wherein the threshold comparison is dependent on the value of the decimal portion of the offset ratio value d'+o, wherein the offset o preferably corresponds to half of the threshold value T. An appropriate choice of the offset o as well as the threshold value T can influence the robustness of the detection of mismeasurements by objects outside the zeroth repetition of the first distance measurement value range $D_1$.

Figure 9:
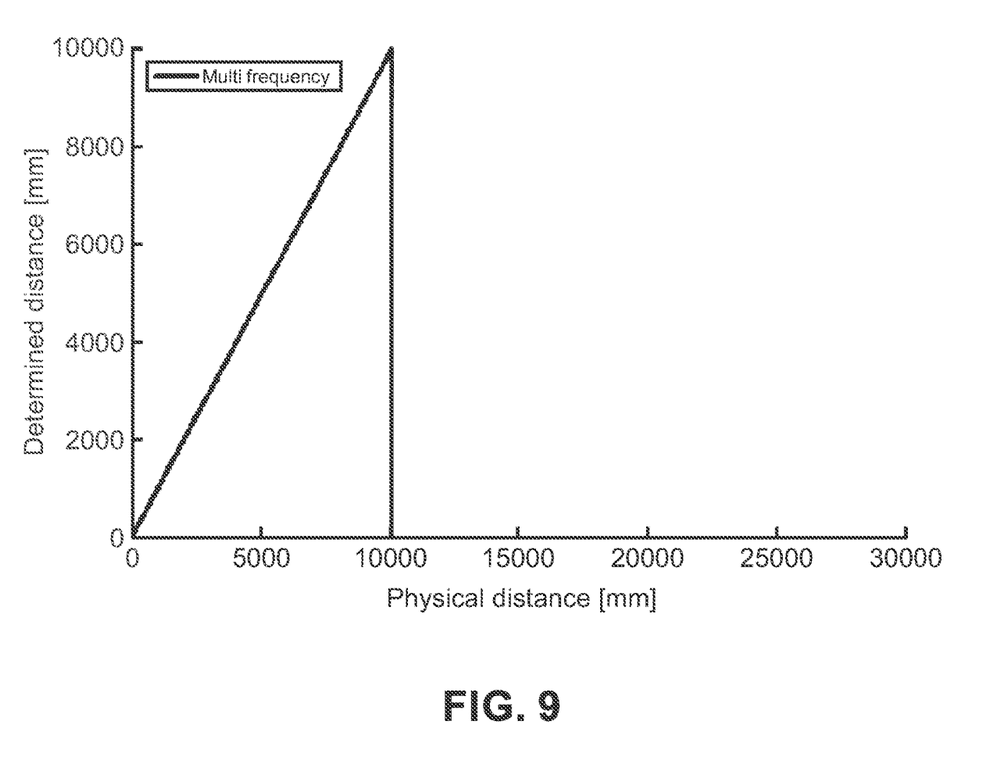

Finally, FIG. 9 shows the result of determining the second distance measurement values $d_2$ according to the invention, by which these can be determined in the larger first distance measurement value range $D_1$ (or in the zeroth repetition of the first distance measurement value range $D_1$) with the quality given by the higher second frequency $f_2$ (reduced noise, etc.).

While in FIG. 6, the end of the zeroth repetition of the first distance measurement value range $D_1$ lies within a repetition of the second distance measurement value range $D_2$ and spaced from the end thereof, wherein the spacing of the ends lies at one third of the second distance measurement value range $D_2$, this can be different in other embodiments. For example, the spacing of the ends can lie in a range of from one half to one tenth, more preferably, in a range of from one half to one fifth, most preferably in a range of from one half to one third of the second distance measurement value range $D_2$. This advantageously depends on how many repetitions of the first distance measurement value range $D_1$ one wants to distinguish. For example, for distinguishing four repetitions of the first distance measurement value range $D_1$, it is particularly advantageous if the distance between the ends lies at one fourth of the second distance measurement value range $D_2$ and for discriminating five repetitions of the first distance measurement value range $D_1$, it is particularly advantageous if the distance of the ends lies at one fifth of the second distance measuring value range $D_2$ range. In general, it is preferred that for discriminating a predetermined number of N of repetitions of the first distance measurement value range $D_1$, the distance of the ends lies at 1/N of the second distance measurement value range $D_2$.

While in FIG. 6, the first frequency $f_1$ lies at 15 MHz and the second frequency is $f_2$ lies at 100 MHz, this can be different in other embodiments. For example, the first frequency $f_1$ can lie in a range of 5 MHz to 25 MHz, preferably in a range of 10 MHz to 20 MHz, and the second frequency $f_2$ can lie in a range from 50 MHz to 150 MHz, preferably in a range from 75 MHz to 125 MHz.

In this embodiment, the ToF camera 10 is adapted to integrate the reflected light signals 16 over a plurality of temporally offset integration phases to generate a plurality of partial measurement images at different phase positions from the first sections $A_1$ of the reflected light signals 16 and from the second sections of the $A_2$ of the reflected light signals, wherein the first distance measurement values $d_1$ and the second distance measurement values $d_2$ are determined from the partial measurement images. For example, three partial measurement images can be generated from both the first sections $A_1$ of the reflected light signals 16 and the second sections $A_2$ of the reflected light signals 16. In this case, the integration phases, which are offset in time with respect to one another, can be realized by means of three electronic shutters $SH_1$, $SH_2$ and $SH_3$ which are opened at corresponding times The integration phases each correspond to the duration of the square pulses and/or the time offsets each correspond to two thirds of the duration of the square pulses (cf. FIG. 2—second to fourth row there).

Further variations of the disclosed embodiments can be understood and carried out by one skilled in the art practicing the claimed invention from a consideration of the drawings, description and appended claims.

In the above embodiments, the oscillations of the first frequency $f_1$ and the oscillations of the second frequency $f_2$ are each periodic sequences of square pulses having a pulse-pause ratio of 1/2. However, the present invention is not limited thereto. In particular, periodic sequences of square pulses with other pulse-pause ratios (e.g., 1/3) can also be used in alternative embodiments. Likewise, it is possible to use sinusoidal or other types of oscillations instead of square pulses.

In the foregoing embodiments, the distance measurements at the first and second frequencies were made on the basis of a total of six partial measurement images. In other embodiments, it is also possible for the measurements to be made on the basis of only four partial measurement images. For example, in an advantageous embodiment, three partial measurement images are generated from the second portions of the reflected light signals and only one partial measurement image is generated from the first portions of the reflected light signals, which gives a total of four partial measurement images (one for the lower first frequency and three for the higher second frequency).

In the foregoing embodiments, the invention has been explained only for the use of a first frequency $f_1$ and a second frequency $f_2$. However, it is also possible to use a "cascading" of frequencies of different height to further increase robustness to pronounced phase noise, multipath effects (including stray light), and motion artifacts. For example, it is possible that the processing unit 13 of the ToF camera 10 is further adapted to process third portions $A_3$ of the reflected light signals 16 modulated with oscillations of a third frequency $f_3$ for determining third distance measurement values $d_3$ in a distance measurement value range $D_3$ that is dependent on the third frequency $f_3$, wherein the third frequency is higher than the first frequency $f_1$ and lower than the second frequency $f_2$ and the third distance measurement value range $D_3$ is smaller than the first distance measurement value range $D_1$ and larger than the second distance measurement value range $D_2$, wherein the processing unit 13 is adapted, in determining the third distance measurement values $d_3$, to resolve ambiguities of the third distance measurement value range $D_3$ within the first distance measurement value range $D_1$ on the basis of the first distance measurement values $d_1$ and, in determining the second distance measurement values $d_2$, to resolve ambiguities of the second distance measurement value range $D_2$ within the third distance measurement value range $D_3$ based on the third distance measurement values $d_3$.

The ToF camera 10 can further comprise an interface 24 for parameterizing the ToF camera 10, wherein a number of frequencies (e.g., three) used for distance measurement and/or a ratio of at least two of the first frequency $f_1$, the second frequency $f_2$ and, if provided, the third frequency $f_3$ can be set by the parameterization.

The processing unit 13 of the ToF camera 10 can be adapted to perform further processing steps, such as filtering of the distance measurement image (e.g., outlier filtering, which detects individual pixels in the distance measurement image whose distance measurement values differ greatly from the distance measurement values in the immediate environment), generation of false color representations, etc.

In the claims, the words "including" and "comprising" do not exclude other elements or steps, and the indefinite article "a" does not exclude a plurality.

A single unit or device can perform the functions of multiple elements listed in the claims. The fact that individual functions and/or elements are listed in different dependent claims does not mean that a combination of these functions and/or elements could not also be used advantageously.

The reference signs in the claims are not to be understood in such a way that the subject matter and the scope of protection of the claims are limited by these reference signs.

In summary, a time-of-flight, ToF, camera for measuring distance information for objects in a scene has been described. The ToF camera comprises a light source for emitting modulated light signals for illuminating the objects, an image sensor for acquiring light signals reflected from the objects, a processing unit for processing first portions of the reflected light signals modulated with oscillations of a first frequency for determining first distance measurement values in a first distance measurement value range that is dependent on the first frequency, and for processing second portions of the reflected light signals modulated with oscillations of a second frequency for determining second distance measurement values in a second distance measurement value range that is dependent on the second frequency, wherein the second frequency is higher than the first frequency and the second distance measurement value range is smaller than the first distance measurement value range, wherein the processing unit is adapted, in determining the second distance measurement values, to resolve ambiguities of the second distance measurement value range within the first distance measurement value range on the basis of the first distance measurement values and to generate a distance measurement image on the basis of only the second distance measurement values, and an output and/or storage unit for outputting and/or storing the distance measurement image, wherein the second frequency is a non-integer multiple of the first frequency, such that the end of the zeroth repetition of the first distance measurement value range lies within a repetition of the second distance measurement value range and spaced from the end thereof, wherein the processing unit is adapted to restrict, on the basis of the spacing, the determining of the second distance measurement value range to the zeroth repetition of a predetermined number of repetitions of the first distance measurement value range.

The invention claimed is:

1. A time-of-flight ("ToF") camera for measuring distance information for objects of a scene, the ToF camera comprising:
a light source for emitting modulated light signals for illuminating the objects;
an image sensor for acquiring light signals reflected from the objects;
a processing unit for processing first portions of the reflected light signals modulated with oscillations of a first frequency for determining first distance measurement values in a first distance measurement value range that is dependent on the first frequency and for processing second portions of the reflected light signals modulated with oscillations of a second frequency for determining second distance measurement values in a second distance measurement value range that is dependent on the second frequency, wherein the second frequency is higher than the first frequency and the second distance measurement value range is smaller than the first distance measurement value range, wherein the processing unit is adapted, in determining the second distance measurement values, to resolve ambiguities of the second distance measurement value range within the first distance measurement value range on the basis of the first distance measurement values and to generate a distance measurement image on the basis of only the second distance measurement values; and
an output or storage unit for outputting or storing the distance measurement image;
wherein the second frequency is a non-integer multiple of the first frequency, such that the end of a zeroth repetition of the first distance measurement value range lies within a repetition of the second distance measurement value range and a spacing from the end thereof, wherein the processing unit is adapted to restrict, on the basis of the spacing, the determining of the second distance measurement values to the zeroth repetition of a predetermined number of repetitions of the first distance measurement value range.

2. The ToF camera according to claim 1, wherein, in resolving the ambiguities, a repetition of the second distance measurement value range is selected within the first distance measurement value range value by means of a scaling factor that is dependent on a ratio value.

3. The ToF camera according to claim 2, wherein the ratio value is determined on the basis of the second distance measurement value range and a difference between the first distance measurement value and an intermediate value of the associated second distance measurement value, wherein for the intermediate value it is not yet determined in which repetition of the second distance measurement value range it lies.

4. The ToF camera according to claim 2, wherein the restricting the determining of the second distance measurement values to the zeroth repetition of the first distance measurement value range occurs on the basis of the ratio value.

5. The ToF camera according to claim 4, wherein the restricting the determining of the second distance measurement values to the zeroth repetition of the first distance measurement value range comprises a comparison with a threshold value, wherein the threshold comparison is dependent on the value of the decimal portion of the ratio value.

6. The ToF camera according to claim 5, wherein the restricting the determining of the second distance measurement values to the zeroth repetition of the first distance measurement value range comprises a shifting of the ratio value by an offset, wherein the threshold comparison is dependent on the value of the decimal portion of the shifted ratio value, wherein the offset corresponds to half of the threshold value.

7. The ToF camera according to claim 1, wherein the spacing of the ends lies in a range from one half to one tenth, one half to one fifth, or one half to one third of the second distance measurement value range.

8. The ToF camera according to claim 1, wherein the first frequency lies in a range from 5 MHz to 25 MHz and the second frequency lies in a range from 50 MHz to 150 MHz.

9. The ToF camera according to claim 1, wherein the oscillations of the first frequency or the oscillations of the second frequency are periodic sequences of square pulses, with a pulse-pause ratio of 1/2.

10. The ToF camera according to claim 9, wherein the ToF camera is adapted, by integration of the reflected light signals over a plurality of integration phases that are offset in time with respect to one another, to generate a plurality of partial measurement images at different phase positions from one or more first sections of the reflected light signals or from one or more second sections of the reflected light signals, wherein the first distance measurement values and the second distance measurement values are determined from the partial measurement images.

11. The ToF camera according to claim 10, wherein the integration phases each correspond to the duration of the square pulses or the time offsets each correspond to two thirds of the duration of the square pulses.

12. The ToF camera according to claim 10, wherein three partial measurement images are generated from the one or more second sections of the reflected light signals and only one partial measurement image is generated from the one or more first sections of the reflected light signals.

13. The ToF camera according to claim 1, wherein the light source is further adapted to emit one or more second sections, which are to be processed for determining the second distance measurement values, temporally before one or more first sections, which are to be processed for determining the first distance measurement values.

14. The ToF camera according to claim 1, wherein the light source is further adapted to emit one or more first sections, which are to be processed for determining the first distance measurement values, and one or more second sections, which are to be processed for determining the second distance measurement values, in a temporally interleaved sequence.

15. The ToF camera according to claim 1, wherein the ToF camera is adapted, in emitting the modulated light signals, to operate the light source during the one or more second portions with a longer exposure time or with a higher current or voltage than during the one or more first sections.

16. The ToF camera according to claim 1, wherein the processing unit is adapted, in determining the first distance measurement values or the second distance measurement values, to perform a correction with respect to a frequency-dependent offset value.

17. The ToF camera according to claim 1, wherein the processing unit is further adapted to process third portions of the reflected light signals modulated with oscillations of a third frequency for determining third distance measurements in a third distance measurement value range that is dependent on a third frequency, wherein the third frequency is higher than the first frequency and lower than the second frequency and the third distance measurement value range is smaller than the first distance measurement value range and larger than the second distance measurement value range, wherein the processing unit is adapted, in determining the third distance measurement values, to resolve ambiguities of the third distance measurement value range within the first distance measurement value range on the basis of the first distance measurement values and, in determining the second distance measurement values, to resolve ambiguities of the second distance measurement value range within the third distance measurement value range on the basis of the third distance measurement values.

18. The ToF camera according to claim 1, wherein the ToF camera further comprises an interface for parameterizing the ToF camera, wherein a number of frequencies used for distance measurement or a ratio of at least two of the first frequency, the second frequency and, if provided, the third frequency can be set by the parameterization.

19. A time-of-flight ("ToF") method for measuring distance information for objects of a scene, the ToF method comprising:
emitting modulated light signals for illuminating the objects;
acquiring light signals reflected from the objects;
processing first portions of the reflected light signals modulated with oscillations of a first frequency for determining first distance measurement values in a first distance measurement value range that is dependent on the first frequency, and processing second portions of the reflected light signals modulated with oscillations of a second frequency to determine second distance measurement values in a second distance measurement value range that is dependent on the second frequency, wherein the second frequency is higher than the first frequency and the second distance measurement value range is smaller than the first distance measurement value range, wherein the processing, in determining the second distance measurement values, resolves ambiguities of the second distance measurement value range within the first distance measurement value range on the basis of the first distance measurement values and generates a distance measurement image on the basis of only the second distance measurement values; and
outputting or storing the distance measurement image;
wherein the second frequency is a non-integer multiple of the first frequency such that the end of a zeroth repetition of the first distance measurement value range lies within a repetition of the second distance measurement value range and a spacing from the end thereof, wherein the processing restricts, on the basis of the spacing, the second distance measurement values to the zeroth repetition of a predetermined number of repetitions of the first distance measurement value range.

* * * * *